(No Model.)
F. E. FISHER.
ARMATURE FOR ELECTRIC MOTORS.
No. 383,564. Patented May 29, 1888.
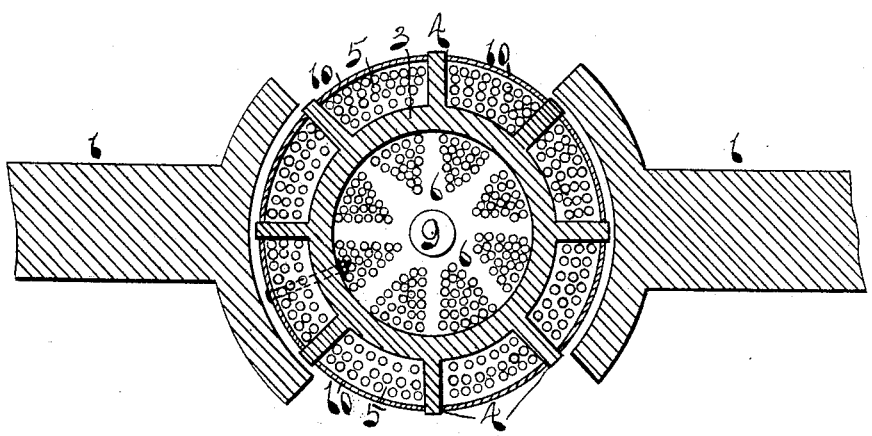

UNITED STATES PATENT OFFICE.

FRANK E. FISHER, OF DETROIT, MICHIGAN.

ARMATURE FOR ELECTRIC MOTORS.

SPECIFICATION forming part of Letters Patent No. 383,564, dated May 29, 1888.

Application filed December 13, 1886. Serial No. 221,424. (No model.)

*To all whom it may concern:*

Be it known that I, FRANK E. FISHER, of Detroit, in the county of Wayne and State of Michigan, have invented a new and useful Improvement in Electric Motors, of which the following is a specification.

My invention consists in an improvement in electric motors, and is a slight modification in construction of the invention for which I filed an application for Letters Patent January 11, 1886.

The drawing represents a vertical section through the poles of the field-magnet and the armature.

1 represents the poles of a field-magnet.

9 represents an armature-shaft, on which is mounted an iron-ring armature, 3, having thereon projecting studs 4, and wound in the ordinary manner with wire, 5 representing the outer layer of wire between the studs 4, and 6 the inner layer within ring 3.

The mode of winding the armature, the construction of the armature-ring, of the field-magnets, commutator, brushes, and circuit are all of any known type and so well understood that I do not deem description thereof necessary.

10 10 represent plates of thin iron placed over the outer layers, 5, of the armature-wire, so as to practically cover said wire and shield it from the action of the field-magnet. I ordinarily use sheet-iron. These strips 10 are secured in any convenient manner to the armature-ring 3 or to the stud 4, or to the armature-shaft.

The magnets, armature, commutator, connection of the armature-coils with the commutator, the commutator-brushes, and the arrangement of the circuit are all of any ordinary well-known type, and I do not deem detailed illustration or description thereof necessary.

It will be observed that the neutral point of the armature remains constant, or practically so, with relation to a fixed point. So long as that is so the particular construction of the armature is immaterial. I usually make the shield of sheet-iron, using somewhat heavier iron for large armatures than for small ones. When the current is passing, the whole exterior of the armature, except at its neutral point, is magnetized, the magnetism being strongest at the poles and equally distributed on both sides, gradually losing its strength toward the neutral point. If the shield is omitted and the armature constructed in any known manner, the surface of the armature, which is covered by wire, is not magnetized to any appreciable extent, and the force of the magnet is exerted on the iron armature beneath the wire or on projecting studs. In a Gramme ring-armature the iron ring cannot be brought close to the poles of the field-magnet, and the greater the depth of wire the greater the distance, thus reducing very rapidly the effective power of the magnet. Where the armature is provided with projecting studs, as in the drawing, the pull of the field-magnet is practically all exerted upon the studs, and the space between the studs, which is occupied by the wire, is of little value. Again, the rotation of the armature between the poles of the magnet generates a reactionary current in the armature, which decreases the efficiency of the machine. This is practically obviated by my invention, as the metallic shield between the wire and field-magnet renders it practically impossible for the coils of the wire to cut the lines of force of a field-magnet. This permits the field-magnet to be made of great power, because an increase in the power of the magnet does not cause an increase of the counter electro-motive force.

The plates 10 may be connected by lugs 11 to a bar 12, passed under the armature-ring, the ends of the lugs being secured by nuts 13; or these lugs may be continued through to the armature-shaft.

What I claim as my invention, and desire to secure by Letters Patent, is—

1. In combination with the armature-ring 3, carrying the wire bobbins 5, the magnetic metal strips 10, placed over the bobbins, substantially as shown and described.

2. In an electric motor, an armature having thereon bobbins of insulated wire, and a magnetic metal plate over each bobbin, whereby as the armature rotates the magnetic metal plate will be between the bobbin and the poles of the field-magnet, substantially as shown and described.

FRANK E. FISHER.

Witnesses:
SUMNER COLLINS,
C. M. MASON.